Dec. 23, 1952     J. E. WILKINSON     2,622,896
VEHICLE SUSPENSION

Filed Nov. 18, 1950     3 Sheets-Sheet 1

Inventor
JOHN E. WILKINSON
By E. G. Stratton
Attorney

Dec. 23, 1952  J. E. WILKINSON  2,622,896
VEHICLE SUSPENSION
Filed Nov. 18, 1950  3 Sheets-Sheet 2
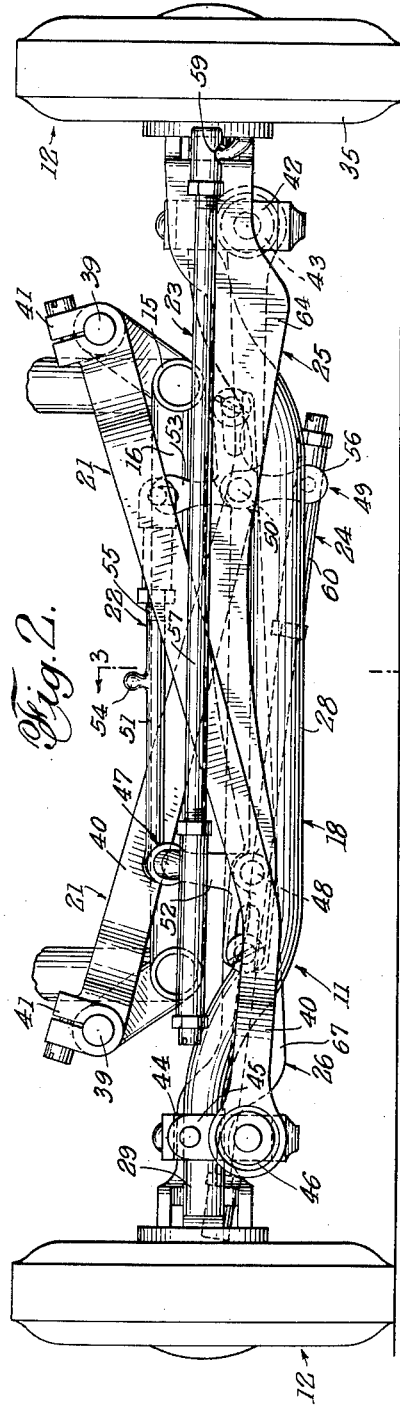
Inventor
JOHN E. WILKINSON
By C. G. Stratton
Attorney Dec. 23, 1952 J. E. WILKINSON 2,622,896
VEHICLE SUSPENSION
Filed Nov. 18, 1950 3 Sheets-Sheet 3
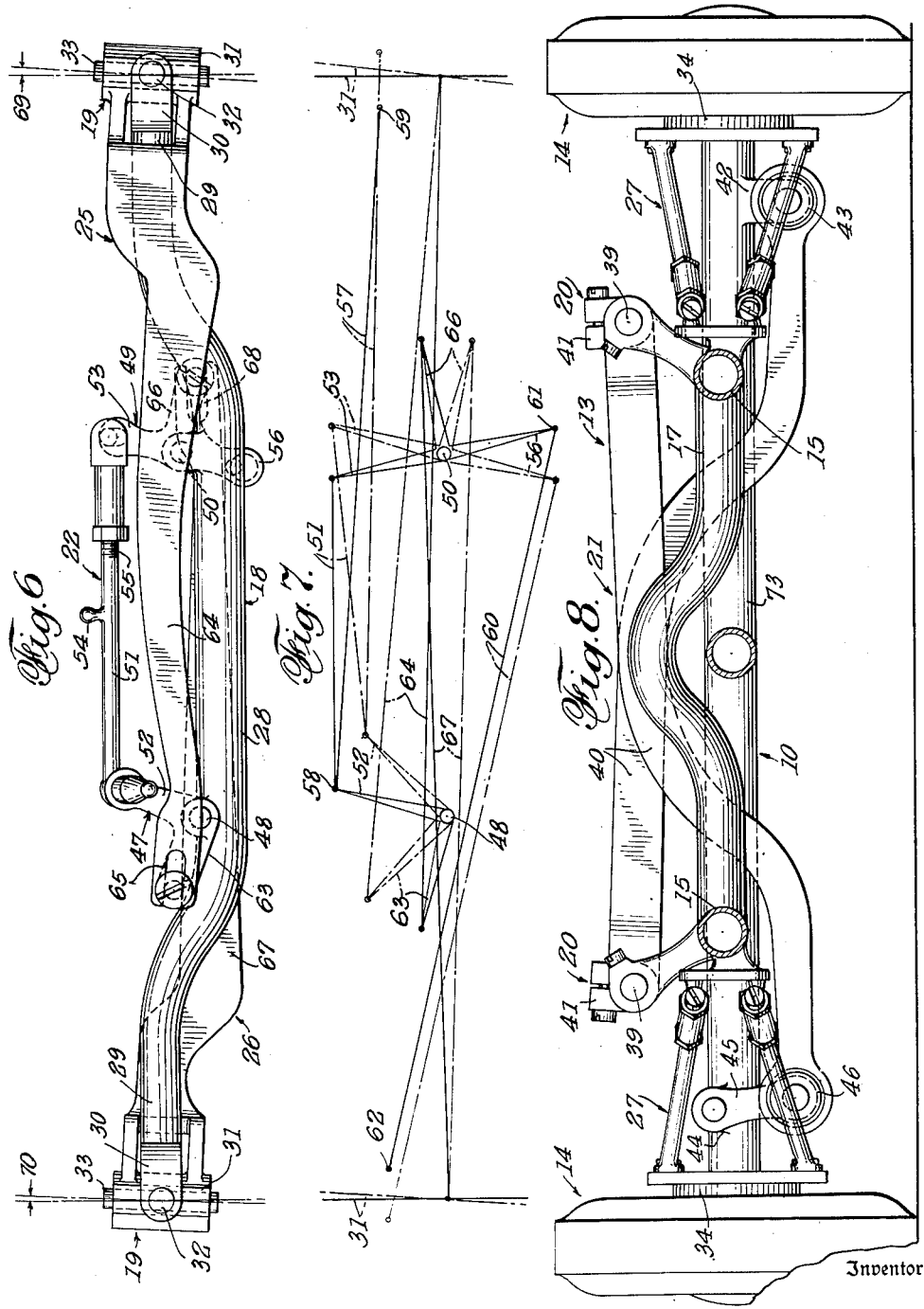
Inventor
JOHN E. WILKINSON
By C. G. Stratton
Attorney Patented Dec. 23, 1952

2,622,896

UNITED STATES PATENT OFFICE 2,622,896

VEHICLE SUSPENSION

John E. Wilkinson, Los Angeles, Calif., assignor of forty per cent to William Douglas Plowden, Van Nuys, Calif.

Application November 18, 1950, Serial No. 196,507

2 Claims. (Cl. 280—124)

This invention relates to vehicle suspension means and deals more particularly with suspensions for automotive vehicles having a pair of non-steerable driven wheels and a pair of non-driven steerable wheels.

An object of the present invention is to provide an improved suspension for the chassis of a vehicle that is underslung for improved stability and in which road shocks on the wheels on one side of the vehicle are received by the opposite side of the chassis, whereby the force of the shock and also the magnitude of reaction thereto by the chassis is minimized.

Another object of the invention is to provide a suspension, as above, in which said road shocks are absorbed by torsion devices located above the chassis so that the latter is disposed between said devices and the points of suspension of the members that transmit the shocks.

Another object of the invention is to provide, in a suspension as indicated, improved wheel-steering means that imparts to the wheels desired steering movement and also movement to a negative camber angle, the same resulting in improved road engagement of the wheels around a turn and minimization of tire wear.

A further object of the invention is to provide steering means by means of which the steering angle of the inner wheel is greater than that of the outer wheel and the attending negative camber of the wheels, while steered may be either equal or unequal as desired.

The invention also has for its objects to provide such means that are positive in operation, convenient in use, easily installed in a working position and easily disconnected therefrom, economical of manufacture, relatively simple, and of general superiority and serviceability.

A still further object of the invention is to provide a novel kingpin mount for the steerable wheels, the same involving location of the kingpins inward of the wheels in line with the tread thereof and also at a caster angle.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is an enlarged front end view thereof, the view being seen at the angle of arrow 2 of Fig. 3.

Fig. 3 is a cross-sectional view, as taken on line 3—3 of Fig. 2.

Fig. 4 is a partly broken outside view of one of the steerable wheels of Fig. 2.

Fig. 5 is a cross-sectional view, as taken on line 5—5 of Fig. 4.

Fig. 6 is a view, similar to Fig 2, showing the means for imparting camber to the steerable wheels in another position, the other elements of the front end being omitted for reasons of clarity.

Fig. 7 is a diagrammatic view of the wheel-steering and camber-imparting means in two positions thereof.

Fig. 8 is a cross-sectional view, to the scale of Fig. 2, as taken on line 8—8 of Fig. 1.

Figure 1:
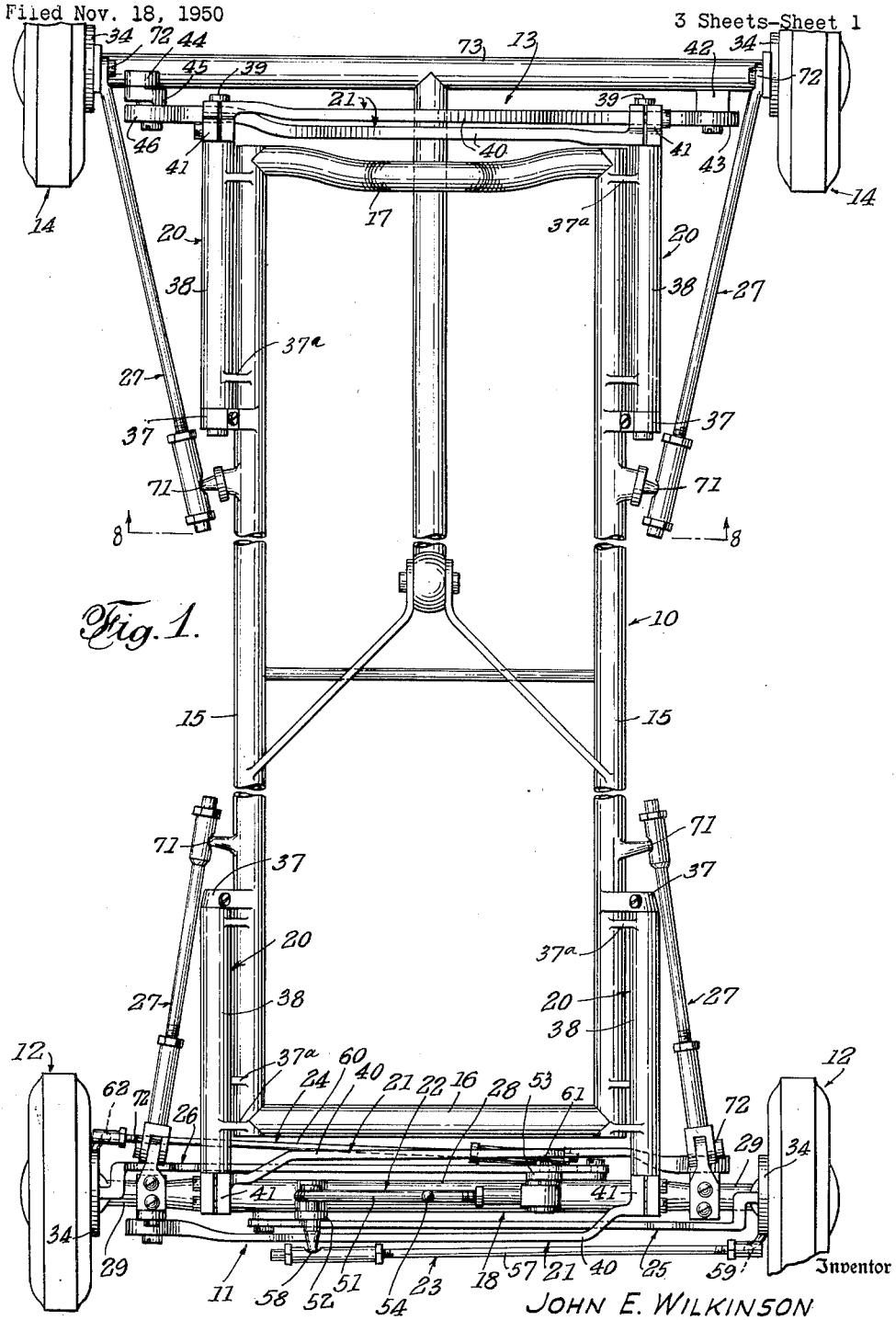
Fig. 1 is a top plan view, partly broken away, of a chassis suspended by means according to the present invention.

The present invention, as embodied in the accompanying drawings, comprises, generally, a chassis 10, a front end suspension 11 having steerable wheels 12, and a rear end suspension 13 having wheels 14.

The chassis 10 may be generally conventional, as shown, the same comprising longitudinal members 15 connected at the front by a cross member 16 and at the rear by a cross member 17. In any case, the chassis comprises a frame that is substantially rigid and which may be braced in any of the usual ways.

The front end suspension 11 comprises, generally, a transverse axle 18, kingpin means 19 connecting wheels 12 to said axle, torque torsion means 20 carried by the chassis 10 on each side thereof, linkage 21 connecting the means 20 on each side to opposite sides of axle 18, linkage 22 shiftable by operation of a conventional steering wheel or the like between an intermediate neutral position (as in Fig. 2) to one side or the other (as in Fig. 6), wheel-steering connections 23 and 24 between linkage 22 and the respective right and left front wheels 12 (as viewed from the front), camber-imparting linkage 25 and 26 between linkage 22 and the respective front right and left wheels, and radius rod support means 27 for axle 18 and connected to chassis 10.

The axle 18 is shown as forward of the front end of chassis 10, being provided with an intermediate portion 28 that is below said chassis and relatively elevated end portions 29 that terminate in end forks 30. While relatively higher than portion 28, said axle portions 29 and forks 30 are preferably lower than the normal plane of the chassis when the latter is unloaded, as shown in Figs. 2 and 3.

The kingpin means 19 for each wheel 12 is best seen in Figs. 4 and 5 and comprises a kingpin 31 pivotally connected by pins 32 to fork 30. From Fig. 4 it will be seen that the kingpins are disposed at a caster angle in which the lower end of the same is forward of the upper end, the forks 30 being angularly arranged accordingly. It will be clear, therefore, that wheels 12 may be tilted on pins 32 to impart camber thereto. Through each kingpin 31 there extends longitudinally a kingpin shaft 33 that is affixed by its ends to hub 34 of each wheel 12. Thus, each said wheel may swing relative to the kingpin at an angle to the horizontal as when steered. In addition, the tire 35 of each wheel 12 may revolve on hub 34 as by means of bearing 36a.

The torque torsion means 20 each comprises a torsion rod or tube 36, a bracket 37 affixing said rod or tube to chassis 19, and a tubular housing 38 enclosing said rod or tube and affixed to the chassis by means of one or more brackets 37a. Torsion rod 36 has an end 39 that extends forward of the forward end of tubular housing 38. From Fig. 3 it will be seen that the means 20 at the forward end of the chassis, while arranged to be parallel to chassis members 15, as viewed in plan, are disposed at an upward forward angle to bring ends 39 to an elevated position with respect to the general plane of the chassis. This angle of means 20 is approximately normal to the caster angle of the kingpin as will be seen from Figs. 3 and 4 and allows for considerable relative movement of chassis 19 and axle 18 without physical interference between said axle and the elevated end of the torsion means 20. The rearward torsion means may be parallel to the plane of the chassis.

The linkage 21 comprises an elongated arm 40 that, by means of a split clamp 41, connects to end 39 of each torsion rod 36. One arm 40 extends to a fixed block 42 on the axle part 29 at the opposite side of the suspension and is affixed to said block as by a self-aligning bearing 43. The other arm 40 extends toward a similar fixed block 44 on the other side of the suspension and is connected to said block through a link 45 and a self-aligning bearing 46. It will be seen from this arrangement that the fixed point of connection at block 42 and bearing 43 fixes the position of the chassis against material lateral movement relative to axle 18, while link 45 swings to accommodate the effective relative movements of bearing points 43 and 46 toward and from each other as the axle and chassis move vertically relatively. The transverse extension of arms 40 is considerably greater than their vertical extension as will be seen in Fig. 2, so that the vertical movement of the ends of said arms is considerably greater than is their horizontal movement.

The axle 18 carries linkage 22 which comprises a two-armed bellcrank 47 on one side of the suspension on a pivot 48, a three-armed bellcrank 49 on the opposite side of the suspension on a pivot 50, and a connecting link 51 extending between the respective arms 52 and 53 of said bellcranks 47 and 49. Link 51 is provided with an extension 54 which connects to the usual steering wheel (not shown) and said link is adjustable for length as on the threads 55. Arms 52 and 53 extend upwardly from pivots 48 and 50 and, in practice, said arms are angled toward each other as seen in Figs. 2 and 7 when wheels 12 are in aligned position. Bellcrank 49 has an arm 56 that extends below pivot 50 in line with arm 53. It will be noted that pivot 50 is elevated somewhat with respect to pivot 48 so that the lower end of arm 56 has suitable road clearance.

Wheel-steering connection 23 comprises a pitman 57 that, through a ball-and-socket 58, connects to arm 52, and a ball-and-socket 59, connects to wheel hub 34 of that wheel 12 which is on the opposite side of the suspension from bellcrank 47. Connection 24 comprises a pitman 60 that, through a ball-and-socket 61, connects to arm 56, and a ball-and-socket 62, connects to the hub on the opposite wheel 12. It will be noted that connections 59 and 62 are made to the rims of the wheel hubs and that one is forward and the other rearward of kingpin pivot shafts 33. Consequently, upon movement of extension 54 of linkage 22, the wheels will turn on their shafts in the same direction.

From Fig. 7 it will be seen that arm 52, when link 51 is moved toward the right, moves from its initial angular position to a position at an increased angle and that arms 53 and 56 move from their initial angular position first to a vertical position and then to an opposite angular position. Because of the fixed length of link 51, arm 52 travels through a greater arc than do arms 53 and 56. Consequently, pitman 57 travels further than does pitman 60 and the wheel at the right turns through a greater arc than does the wheel at the left. Movement of link 51 in the opposite direction reverses these turning movements of the wheels since arms 53 and 56 move through a greater angle than does arm 52.

The camber-imparting linkage 25 comprises a laterally directed arm 63 on bellcrank 47 and a transverse arm 64 rigidly affixed to the kingpin 31 on the opposite side of the suspension and having a slotted connection 65 with the end of said arm 63. The camber-imparting linkage 26 similarly comprises a laterally directed arm 66 on bellcrank 49 and a transverse arm 67 rigidly connected to the other kingpin and having a slotted connection 68 with the end of arm 66.

Arms 63 and 66 are oppositely directed so that the former moves up and the latter down when bellcranks are tilted toward the right as above. Consequently, the kingpins from their vertical but caster-angled position will be tilted to the respective angles designated 69 and 70, respectively. The larger arc of movement of arm 63 carries a greater tilting of the kingpin at the right so that angle 69 is greater than angle 70. Opposite movement of link 51 will result in a reversal in which angle 70 is the greater. Thus the negative camber of the wheels, when steered, is greater for the inner wheel than for the outer.

The radius rod means 27, as seen in Figs. 1 and 3, connects chassis 10 with blocks 42 and 44 that are affixed to axles 18 and supports said axle against relative forward or rearward movement. To allow for freedom of relative vertical movement of the chassis and axle, the radius rods each have a universal connection 71 to the chassis and a horizontal pivotal connection 72 to blocks 42 and 44, as the case may be. Said radius rods are preferably arranged in pairs as shown.

The rear end suspension 13 omits the above-described wheel-steering means but, in substantially similar form, retains the torsion means 20, the linkage 21 and the radius rod means 27 that interconnect chassis 10 and rear axle 73. Similar numerals designate parts comparable to the parts described for the front end. In the drawing, the rear axle has been more or less conventionalized although it will be clear that the usual differential may be embodied in the construction without change.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A vehicle suspension comprising a generally horizontal chassis, a transverse axle arranged beyond each end of the chassis, each axle mounting a pair of wheels, each axle, adjacent one end thereof, being provided with a fixed pivot below the axis of the axle and below the plane of the chassis, each axle, adjacent the opposite end thereof, being provided with an extension above the axis of the axle, a link pivotally depending from each said extension, a suspension member extending transversely from each fixed pivot and from the free end of each link toward the opposite side of the chassis, and torsion means carried by the chassis above the general plane thereof and connected to said suspension members, the torsion means comprising elongated devices, the devices at one end of the chassis being horizontally parallel to the plane of the chassis and the devices at the other end being angularly disposed.

2. A vehicle suspension comprising a generally horizontal chassis, a transverse axle arranged beyond each end of the chassis, each axle mounting a pair of wheels, each axle, adjacent one end thereof, being provided with a fixed pivot beyond the axis of the axle and below the plane of the chassis, each axle, adjacent the opposite end thereof, being provided with an extension above the axis of the axle, a link pivotally depending from each said extension, a suspension member extending transversely from each fixed pivot and from the free end of each link toward the opposite side of the chassis, torsion means carried by the chassis above the general plane thereof and connected to said suspension members, and radius rod means interconnecting the chassis and each of said axles, the latter means comprising a pair of radius rods connecting the chassis and each end of both axles, a horizontal pivot between the axle ends and the rods of each pair, and a universal connection between the chassis and each of said rods.

JOHN E. WILKINSON.

REFERENCES CITED

The following references are of record in the file of this patent:

UNITED STATES PATENTS

| Number | Name | Date |
|---|---|---|
| 326,692 | Stouffer | Sept. 22, 1885 |
| 1,633,151 | Winsor | June 21, 1927 |
| 2,033,493 | Straussler | Mar. 10, 1936 |
| 2,216,930 | Altemus | Oct. 8, 1940 |
| 2,242,030 | Hicks | May 13, 1941 |
| 2,404,794 | Fageol | July 30, 1946 |

FOREIGN PATENTS

| Number | Country | Date |
|---|---|---|
| 212,962 | Switzerland | Dec. 31, 1940 |